G. AMSDEN.
GRAIN-BASKET.

No. 177,783.

Patented May 23, 1876.

Witnesses:
F. B. Townsend
D. G. Weems

Inventor:
Galen Amsden
per attys.
A. H. Evans & Co.

UNITED STATES PATENT OFFICE.

GALEN AMSDEN, OF MINNEAPOLIS, MINNESOTA.

IMPROVEMENT IN GRAIN-BASKETS.

Specification forming part of Letters Patent No. 177,783, dated May 23, 1876; application filed November 12, 1875.

*To all whom it may concern:*

Be it known that I, GALEN AMSDEN, of Minneapolis, Minnesota, have invented a new and useful Improvement in Baskets, of which the following is a full, clear, and exact description, reference being had to the accompanying drawings, making a part of this specification, in which—

Figure 1:
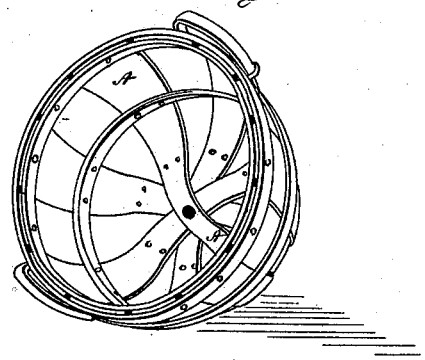
Figure 2:
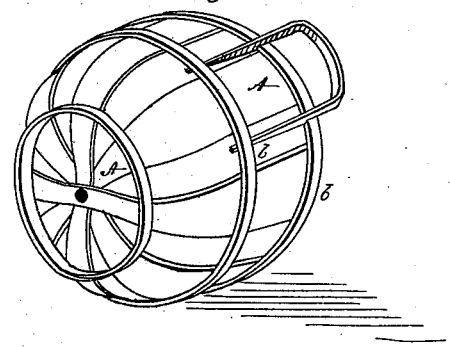
Figure 3:
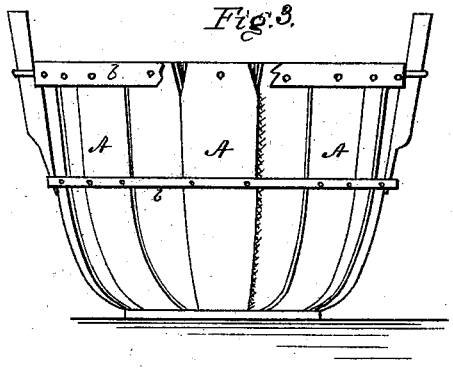

Figure 1 is a perspective view showing the inside. Fig. 2 is a similar view showing the outside. Fig. 3 is a side elevation, with a portion of the outer band broken away to show the lapping of the staves.

My invention relates to that class of baskets used in moving grain and other heavy articles; and it consists in the manner of making, forming, and lapping of the staves to form a single-stave basket, which will be cheap, neat, and durable.

To enable others skilled in the art to make and use my invention, I will proceed to describe the exact manner in which I have carried it out.

In the common stave basket the staves are made thin and narrow, and are usually doubled in building the basket, and whenever the inner or the outer stave gives way the basket becomes practically worthless. Instead of making my staves narrow and one-sixteenth of an inch thick, (the usual thickness in a bushel-basket,) and then doubling them in the construction of the basket, I make them about four inches wide and five-thirty-seconds ($\frac{5}{32}$) of an inch in thickness, thereby using fewer staves and materially reducing the cost of the article, while I produce a much more durable basket for the market. The thickness of my staves makes the basket almost rigid, and it does not bend down under the load, nor is it liable to break from contact with a bin, wagon, or other article.

In the drawings, A A represent the staves, which form, at once, the sides and bottom of the basket. By using broad staves I am enabled to make a single-stave basket with a bottom which is neither thick nor clumsy, as is the case in the narrow stave basket, in which each stave of course increases the thickness of the bottom, being laid in succession on the top of each other. The broad staves A A are cut on the segment of a circle, somewhat similar to the staves of a barrel, and are tapered to suit the shape of the basket, as shown in Fig. 2. These broad staves are slightly lapped at their edges to cover the joint, and are notched at the outer ends, as shown in Fig. 3, by which means I am enabled to bring the extreme ends into one unbroken circle around the top of the basket, as if no lapping had taken place. The bands *b b* secure the staves in position.

Having thus explained my invention, what I claim as new, and desire to secure by Letters Patent, is—

1. The staves A A of a stave basket, lapped and notched, substantially as and for the purpose set forth.

2. A single-stave basket, constructed as described, and consisting of the staves A A, cut, tapered, and formed in the manner set forth.

GALEN AMSDEN.

Witnesses:
LEWIS MAISH,
VERNON BELL.